United States Patent [19]

Brown et al.

[11] 4,157,375
[45] Jun. 5, 1979

[54] CONVERSION OF NITROGEN OXIDES

[75] Inventors: Stanley M. Brown, Scotch Plains; Gerald M. Woltermann, North Plainfield, both of N.J.

[73] Assignee: Engelhard Minerals & Chemicals Corporation, Menlo Park, Edison, N.J.

[21] Appl. No.: 891,503

[22] Filed: Mar. 30, 1978

Related U.S. Application Data

[63] Continuation-in-part of Ser. No. 856,658, Dec. 2, 1977.

[51] Int. Cl.$^2$ .............................................. B01D 53/34
[52] U.S. Cl. .................................... 423/239; 423/212; 423/118; 252/455 Z
[58] Field of Search .................. 423/212, 213.2, 213.5, 423/239, 118; 252/455 Z

[56] References Cited

U.S. PATENT DOCUMENTS

| | | | |
|---|---|---|---|
| 3,468,815 | 9/1969 | Cole et al. | 252/455 Z |
| 3,839,225 | 10/1974 | Acres | 423/239 X |
| 3,895,095 | 7/1975 | Carter et al. | 423/212 X |
| 3,939,246 | 2/1976 | Rollman | 252/455 Z |
| 4,007,134 | 2/1977 | Liepa et al. | 252/455 Z |

FOREIGN PATENT DOCUMENTS 51-91868  8/1976  Japan ..................... 423/239 A Primary Examiner—G. O. Peters
Attorney, Agent, or Firm—Inez L. Moselle

[57] ABSTRACT

Zeolite catalyzed reduction of nitrogen oxides in exhaust gases is conducted with catalytic elements in the form of multi-channel structures in which parallel channels are defined by thin walls constituted by refractory oxides having zeolite dispersed therein and accessable to diffusion from surfaces of the channel walls. Such structures, preferably monolithic honeycomb forms, are prepared by calcining extruded or cast forms or kaolin at elevated temperatures and treating the calcined kaolin honeycomb with a caustic solution to develop a desired zeolite within the wall members and etch the wall surfaces to provide diffusion paths to and from the embedded zeolite. Such structures are peculiarly suited to high space velocity processes such as reduction of nitrogen oxides in providing for protection of the zeolite catalyst against erosion by high velocity gas streams while also providing adequate diffusivity for reactants at the high space velocities typical of the known reaction between oxides of nitrogen and a reducing agent such as ammonia.

10 Claims, No Drawings

CONVERSION OF NITROGEN OXIDES

CROSS-REFERENCE TO RELATED APPLICATION

This application is a continuation-in-part of copending application Ser. No. 856,658, filed Dec. 2, 1977.

FIELD OF THE INVENTION

The invention concerns the environmentally important removal of undesirable nitrogen oxides (hereinafter "$NO_x$") from gases discharged to the atmosphere. Examples of such exhaust gases are those from high temperature combustion of fuel by internal combustion engines, fired furnaces and the like wherein nitrogen and oxygen react at the high prevailing temperature to "fix" nitrogen as one or more of the several stable oxides. Exhaust gases containing objectionable $NO_x$ are also generated in such chemical operations as manufacture of nitric acid, nitration of organic chemicals and other operations of similar nature. Of the several oxides which can be present, the oxides which form nitrous or nitric acid by combination with water are of primary importance from the standpoint of air quality. Thus, NO and $NO_2$ removal is a principal aim of techniques for removing $NO_x$.

The oxides of nitrogen generally are suspected of contribution to photochemical smog and, in general, it is considered desirable that $NO_x$ discharges be held to a minimum, particularly in areas susceptible to photochemical smog, such as the Los Angeles basin.

Of the several classes of techniques for control of $NO_x$ emissions, this invention is particularly concerned with reduction of $NO_x$ to environmentally acceptable nitrogen and water.

BACKGROUND OF THE INVENTION

In recent years, increasingly intensive effort has been devoted to systems for improvement of air and water quality. For the most part, those efforts are concerned with control of emissions from facilities created by man, possibly because these are regarded as the only sources of contamination subject to effective control at acceptable cost. One of the sources of air contamination which has been given attention is emission of $NO_x$ generated by fixation of atmospheric nitrogen in high temperature zones of combustion processes such as in internal combustion engines and fired furnaces. As noted above, two of the oxides of nitrogen combine with water to form corrosive acids; all the oxides of nitrogen are suspected of contribution to photochemical smog.

Several methods for reducing $NO_x$ emissions have been investigated and reported. It has been proposed that these air contaminants be reacted with or absorbed by liquid or solid agents, thus posing a disposal problem with respect to the spent reagent. It has been shown that $NO_x$ can be reacted with various reducing agents including carbon monoxide, hydrogen and ammonia to leave innocuous agents for discharge to the atmosphere. For example, ammonia reacts with $NO_x$ under proper conditions to yield nitrogen and water which can be freely discharged without adverse effect.

It has been demonstrated that the transition metals are catalysts for conversion of $NO_x$ by reaction with reducing agents such as carbon monoxide and ammonia. Patent application Ser. No. 340,809 distributed by National Technical Information Service of the U.S. Department of Commerce describes the use of ion exchanged zeolite, specifically mordenite, as catalyst for reduction of $NO_x$ by carbon monoxide. Thomas and Pence reported reduction of $NO_x$ with ammonia catalyzed by a zeolite in a paper entitled "Reduction of $NO_x$ with Ammonia over Zeolite Catalysts" presented at the Air Pollution Control Association Meeting at Denver, June 10, 1974. The specific catalyst employed by Thomas et al. was hydrogen mordenite.

Those zeolite catalysts have been used in the form of extrudate pellets in beds which produce substantial pressure drop. In fixed installations such as fired furnaces, the pressure drop through the bed constitutes a reduction in draft applied by the stack. In mobile equipment, automobiles and the like, the bed pressure drop applies a back pressure to engine exhaust which tends to reduce efficiency of the internal combustion engine. A like effect of pelleted platinum catalyst for oxidation of carbon monoxide and unburned hydrocarbons in automative exhaust was obviated by applying the metal to "monolithic honeycomb" structures of refractory support material. Metals on monolithic honeycomb have also been proposed for reduction of $NO_x$. Similar application of zeolites to the surface of honeycomb refractory raises problems of abrasion of the zeolites, which are relatively fragile as compared to platinum by gases and entrained fly ash or other solids.

British Pat. No. 1,441,448 contemplates the use of a grid work of honeycombs superficially coated with zeolite crystals as a catalyst, especially for cracking of petroleum hydrocarbons. The patent does not disclose catalytic composites in which zeolite is embedded or disseminated throughout a porous matrix that permits access to the active zeolitic crystals while minimizing losses of the crystals due to attrition during use or handling.

The synthesis of zeolites from calcined clays, especially kaolin clay, is known. For example, it is well-known that metakaolin (kaolin clay calcined at a temperature of about 1200° to 1500° F.) will react with sodium hydroxide solution to produce sodium zeolite A. It is also known that when kaolin is calcined under more severe conditions, for example 1700° to 2000° F., it will react with sodium hydroxide solution, small amounts of metakaolin preferably being present, to synthesize faujasite-type zeolites useful in hydrocarbon conversion processes. Reference is made to the following commonly assigned patents of Haden et al.: U.S. Pat. Nos. 3,335,098, 3,338,672, 3,367,886, 3,367,887, 3,391,994, 3,433,587, 3,503,900, 3,406,594, 3,647,718, 3,657,154, and 3,663,165. In the processes of these patents synthetic faujasite-type zeolite is crystallized either as a pulverulent mass or as composite fluid or pelleted particles.

In accordance with the teachings of U.S. Pat. No. 3,119,660 to Howell et al., preformed metakaolin or preformed mixtures of metakaolin and zeolite A were reacted with caustic to form 100 percent zeolite A. By adding sources of soluble silica to the reaction mixture, zeolite X or zeolite Y was formed as a constituent of pellets or the like.

U.S. Pat. No. 4,007,134 to Liepa et al. deals with the use of extruded zeolitic honeycombs in the carbonation of soft drinks. The honeycombs contain over 40% zeolite and are prepared by extruding preformed zeolitic molecular sieve crystals, preferably with a known binder such as clay, and calcining the resulting extrudate to harden the structures. It is well-known that zeolitic molecular sieve crystals lack thermal stability when they are calcined at high temperatures. While high temperatures favor hardening of clay binders, the presence of the zeolite in the unfired honeycomb structures of U.S. Pat. No. 4,007,137 precludes the use of high temperatures, e.g., 1700° F. or above. Temperatures of this order are needed to secure the high strength required for many uses of catalysts and catalyst supports. This process limitation is obviated by practice of the process of the instant invention.

SUMMARY OF THE INVENTION

The invention provides an improved manner of applying the known technique of reducing $NO_x$ by reaction with ammonia, carbon monoxide, or other reducing gas in the presence of zeolite catalyst. Accordingly, it is a primary object of the invention to provide zeolite catalyst for that reaction in a physical form which provides the low pressure drop and freedom from clogging by fly ash which is found with monolithic honeycomb structure without exposing the relatively fragile zeolite to erosive effects. It is an important aspect of the invention that the zeolite is unimpaired as to catalytic activity and accessibility to reactants as would be the case if the monolith were prepared by extrusion of a dispersion of zeolite in clay and firing to form the ceramic honeycomb. In such cases, diffusivity is limited by the fixed matrix material surrounding the zeolite and the zeolite is subject to thermal degradation in the firing step.

The zeolite catalysts are made available for treating exhaust gases by novel refractory structures of monolithic honeycomb or other channeled form in which the zeolite is embedded in the refractory. The particular structures provided by the invention are etched by steps in the manufacturing process such that gases readily diffuse through the refractory to be converted by catalysis at the embedded zeolite and reaction products diffuse to the surface at rates which facilitate use at the very high space velocities needed for use in conversion of exhaust gases. These structures of refractory bodies of high diffusivity containing embedded zeolites exhibit low pressure drop because they provide parallel channels for free flow of gases in contact with the thin walls which define the channels.

An object of the invention is to provide zeolitebinder composites in the form of a multichanneled monolithic mass, especially honeycombs, which possess chemical and structural properties required for use as catalysts in reduction of $NO_x$ contained in exhaust gases.

One aspect of the invention comprises use of a rigid catalyst structure in the form of a monolithic body having a plurality of channels extending therethrough, for example a honeycomb, the body comprising crystals of a synthetic zeolitic aluminosilicate molecular sieve formed in situ from a monolithic multichanneled precursory body of calcined amorphous clay, the crystals of molecular sieve being disseminated throughout the body in an essentially amorphous alumina-silica porous residue of anhydrous calcined clay.

Another aspect of the invention comprises reduction of $NO_x$ by use of a catalyst formed by the in situ synthesis of a zeolitic aluminosilicate molecular sieve within a preformed calcined kaolin clay honeycomb by reacting the preformed honeycomb with an aqueous solution of a base to effect the synthesis. During the synthesis, substantial silica and/or alumina is leached from the preformed honeycomb by the basic solution. This results in adequate diffusion during synthesis and then imparts desirable porosity in the amorphous alumina-silica component of the finished catalyst composite. In a preferred embodiment the preformed honeycomb is obtained by calcining a green multichanneled monolith such as a honeycomb consisting essentially of kaolin clay and free from fluxes, at a temperature in the range of about 1700° to 2000° F. This calcination step imparts excellent mechanical strength to the calcined preformed honeycomb so that even when thinwalled honeycombs are produced, they do not disintegrate during zeolite synthesis. Furthermore, the high temperature calcination insures excellent strength and hydrothermal stability in the zeolitized honeycomb structure and is required to synthesize certain zeolites such as faujasite or ZSM-5.

DESCRIPTION OF PREFERRED EMBODIMENTS

Known methods for producing ceramic honeycombs may be used in preparing the given forms to be processed in manufacture of catalyst for use in practicing the invention. However, it is preferable to select a forming technique which does not necessitate the incorporation of a nonfugitive forming aid such as talc or mineral substance (other than kaolin clay or metakaolin) which might be a deleterious impurity. Generally fluxes such as alkali or alkaline earth compounds are excluded from the mixture employed to produce the green honeycomb since fluxes may react with the clay constituent during the firing step and thereby prevent the desired subsequent reaction between the fired clay in the honeycomb body and the alkali in the reaction medium. Thus, the green honeycomb should preferably contain only fugitive, soluble and/or pyrolitically decomposable forming aids. Honeycomb forming techniques which use thermoplastic organic vehicles alone or in combination with solvents are useful.

One suitable technique for producing a green honeycomb is described in British Pat. No. 1,371,082 to Langley et al. In accordance with this patent, a formulation consisting essentially of precursor inorganic material such as clay and a thermoplastic vehicle such as a wax is prepared. The formulation is solid at room temperature and fluid at elevated temperature. The mixture while warm is forced by a squeegee through a stencil defining a print (layer) of the honeycomb body in two dimensions. The print is solidified as a layer after it passes through the stencil. Successive overlap of prints build up a three dimensional honeycomb which is fired to eliminate the thermoplastic vehicle. In effect this is a discontinuous extrusion and is very useful in producing thin-walled honeycombs, for example honeycombs having from 200 to 300 channels per square unit. Wall thickness may vary over a substantial range. Honeycombs of any height, for example ¼ inch up to a foot or more, can be produced.

Corrugation techniques such as described in Re. No. 27,747 to Johnson may also be used. In one corrugation process a ceramic powder is made into a tape with an organic binder. The tape is formed at room temperature into a honeycomb structure which is heated to burn off the binder and sinter the ceramic. In practice of the present invention, sintering is avoided, as discussed below. Fugitive organic carriers that are removed during final heating are also useful in some corrugation techniques.

High pressure extrusion techniques, such as described in British Pat. No. 1,142,800, can also be employed. Other suitable techniques are described in Re. No.

28,195 to Sergeys and U.S. Pat. No. 3,837,783 to Bagley.

Irrespective of the honeycomb formation equipment that is employed, the self-supporting green honeycomb consisting of hydrated kaolin clay and temporary binder is calcined, preferably at 1700° to 2000° F., for a time sufficient to dehydrate the clay. The heat treatment should be controlled to avoid slumping, cracking and fusion. Normally heat treatment is conducted by gradually increasing the temperature of the monolith to volatilize and burn out temporary binder or vehicle until the desired elevated temperature is reached. At this time the temperature can be maintained at that level.

During heat treatment the hydrated kaolin clay undergoes the characteristic kaolin endotherm associated with dehydration when it is heated to a temperature of about 1350° F. Subsequently the resulting metakaolin undergoes the characteristic exothermic reaction when it is heated to a temperature of about 1800° F.

It is essential to calcine the preformed honeycomb structure at a temperature of 1700° F. or above in order to convert it to a state or condition such that it is useful in the synthesis of a catalytically suitable zeolite such as faujasite, mordenite or ZSM-5. Lower temperatures such as 1350° F. will generally limit zeolite synthesis to the formation of zeolites such as type A (U.S. Pat. No. 2,882,243) unless an additional source of silica, for example sodium silicate, is employed as a reactant. Furthermore, temperatures of 1700° F. or above lead to the formation of honeycombs that will be considerably stronger than those obtainable at lower temperatures, e.g., 1350° F. On the other hand, temperatures appreciably above 2000° F. result in recrystallization of silica and/or alumina phases which generally are deleterious to the reactivity of the components in the precursor honeycomb with basic solutions. Thus, the calcined honeycomb is preferably amorphous or essentially so when tested by a conventional X-ray diffraction technique (see the Haden et al. patents supra).

Bases known to be useful in zeolite synthesis, including alkali metal hydroxides, ammonium bases, as well as mixtures thereof, may be employed in practice of the invention. The base or mixture of bases are dissolved in water and the solution added in amount at least sufficient to cover the honeycomb to be zeolitized. Depending on the zeolite to be synthesized, soluble sources of silica and/or alumina may be added to the aqueous reaction medium. Generally aqueous solutions of 2 to 15% weight concentration are used. The amount of solution, controlled to provide the desired ratios of alkali (and/or ammonium oxide) to $Al_2O_3.2SiO_2$ in the calcined preformed honeycomb, will obviously vary with the zeolite that is to be synthesized within the honeycomb and with the concentration of the solution of the base.

Generally the reactions are carried out at atmospheric or elevated pressure at elevated temperature for a time sufficient to achieve crystal formation within the honeycomb structure. In the case of faujasite synthesis, a low temperature (aging step) may precede the high temperature crystallization. The zeolite is crystallized in hydrated form.

Preferably the zeolitized honeycombs will contain about 2 to 90%, most preferably 10–65%, crystalline zeolite as determined by X-ray diffraction. It will be noted that complete conversion of the honeycomb to zeolite is avoided since the structures may lack mechanical strength and diffusity imparted by the porous non-zeolitic alumina-silica matrix constituent.

After synthesis the structure may be subjected to ion exchange treatment in known manner to replace cations present as a result of synthesis with more desirable cations. For example, exchangeable sodium may be reduced to 1% or below by ion exchange with ammonium salts, ammonium and rare earth salts or alkaline earth metal salts. The exchange is facilitated by the fact that the channels in the structures provide access of the fluid exchange medium and the nonzeolite constituent permits diffusion of the solution to the zeolite crystals. Similarly, the monolithic bodies are readily separated from liquids by filtration. Problems experienced in exchanging and filtering powdered zeolites are avoided.

The ion exchange of the crystal-bearing structure may be conducted in a fashion to take advantage of the known properties of transition metal or hydrogen form of zeolites for $NO_x$ reduction as described in the prior art reviewed above.

The following examples are illustrative of practice of the invention but are not considered to be limiting to the specific features utilized therein except as set forth in the appended claims.

In the examples a honeycomb preform was prepared by pretreating 949 parts high purity kaolin clay having a $SiO_2/Al_2O_3$ molar ratio of 2/1 with 9.6 parts silane Y-9187 to render the clay particles hydrophobic. The treated clay was dried, added to a mixture of 314 parts stearic acid, 34 parts gilsonite, 4.1 parts of a modified lecithin wetting agent and 2.6 parts ethyl cellulose, and heated to 158° to 176° F. The clay mixture was agitated for ½ hour and then extruded through a stencil by the technique described in British Pat. No. 1,371,082 to Langley et al. at a temperature of 140° F. After formation the honeycomb was solidified in water and the organics were burned out in air by increasing the temperature 0.20° F. per minute to 527° F. and then holding at this temperature 2.5 hours. The honeycomb was then calcined for two hours at 1800° F. The honeycomb contained 225 channels per square inch. Wall thickness was 0.02 inch. Length and diameter were 2 inches and 2.5 inches, respectively.

In one example, a monolith containing zeolite ZSM-5 was prepared. Thirty-nine and three-tenths (39.3) grams of the calcined honeycomb preform, 7.0g. of NaOH, 45 g. of tetra-n-propyl-ammonium bromide, and 210 ml. of water were charged to a Pyrex-lined autoclave. The mixture was heated without agitation at 275° F. for six days. The honeycomb was then removed, washed with water and dried. A protion of the honeycomb was ground up for analysis and X-ray diffraction analysis. The peaks at 8.1°, 9°, 16°, 23°, 24° and 29.4° $2\theta$ corresponding to interplanar spacings in A. of 11.15, 10.01, 5.56, 3.82, 3.64 and 2.98, respectively, indicated that the product contained approximately 29% ZSM-5. The amount of zeolite was estimated by comparison of the peak intensities with those of ZSM-5 prepared according to Example 23 of U.S. Pat. No. 3,702,886 and assumed to be 95% ZSM-5. By substituting other quaternary ammonium bases (known in the art), other known members of the ZSM-5 type zeolites, such as ZSM-11 and 12, may be produced.

In another example, a monolithic honeycomb containing synthetic crystalline faujasite was produced. Forty-one grams of the calcined honeycomb, 21 g. of NaOH and 141 ml. of water were added to a 500 ml. resin kettle. The mixture was aged without agitation at 100° F. for six hours and then heated at 180° F. for sixteen hours. The resulting product was washed with water and dried. X-ray diffraction analysis of the 6.1°, 16° and 27° 2θ peaks showed that the product contained 29% synthetic crystalline faujasite with a $SiO_2/Al_2O_3$ ratio of 3.3 as determined by X-ray, using the Freeman and Stamires curve to correlate Å. and $SiO_2/Al_2O_3$.

In still another example, 41 g. of the calcined honeycomb, 21 g. of NaOH and 141 ml. of water were added to a 500 ml. resin kettle. The mixture was aged at 100° F. for six hours without agitation and then heated at 180° F. for 5-½ hours. At this point 100 ml. of water was added to the reaction vessel to dilute the mixture and retard crystallization. The mixture was heated at 180° F. for an additional 17-½ hours. The honeycomb was removed, washed and dried. X-ray diffraction analysis indicated the product contained 18% synthetic crystalline faujasite having a $SiO_2/Al_2O_3$ ratio of 3.9 as determined by X-ray analysis.

A representative zeolitized product useable in practicing the invention was analyzed by X-ray and found to contain 8% synthetic crystalline faujasite. By wet chemical analysis the structure contained 36% $SiO_2$. Since the calcined honeycomb preform contained about 54% $SiO_2$, a substantial percentage of the silica originally present in the kaolin was therefore leached from the honeycomb during the crystallization. The honeycomb was found to contain 0.12 cc./g. in pores of less than 100 A. diameter as measured by the nitrogen isotherm method.

In another example 42 g. of the calcined honeycomb was added along with 8 g. NaOH and 215 ml. of $H_2O$ to an autoclave and the mixture heated at 257° F. for three days and then at 284° F. for four additional days. The product was water washed and dried. X-ray diffraction analysis of the 10.0°, 13.6°, 19.8°, 22.3°, 26.1° and 27.9° 2θ peaks corresponding to interplanar spacings in A. of 13.4, 6.49, 4.50, 3.98, 3.42 and 3.15, respectively, indicated the amount of mordenite to be approximately 30%, as compared to a Zeolon 900 sample assumed to be 100% H-mordenite.

In applying the catalyst of this invention to reduction of $NO_x$ in exhaust gas, it is usually preferable to use the acid form of the zeolite when the reducing agent is ammonia. When carbon monoxide is the reducing agent, transition metal forms of zeolite are preferred. Choice of zeolite will be influenced by nature of the exhaust gas treated. For highly acid environment, the more acid resistent zeolites are considered to be more stable, for example mordenite and the variations of zeolite ZSM-5 which show high silica/alumina ratios upwards of about 30.

Space velocity will range upwards of about 3000 volumes of gas treated per volume of catalyst per hour. At space velocities of 60,000, efficiency may be severely impaired. Temperatures of treatment can vary over a broad range and will generally be selected to suit operating parameters of the installation where used by designing the facility for good thermal efficiency and adapting the $NO_x$ converter to a location in the direction of gas flow which is convenient to the engineering of the plant. The temperatures of treatment will be below those which tend to impair the crystalline structure of the zeolite and below those which can lead to thermal fixation of nitrogen downstream of the $NO_x$ converter. For most installations, temperatures up to about 800° C. can be effective, but gases containing substantial amounts of water may require lower temperatures due to the greater sensitivity of zeolites to elevated temperature in the presence of steam. The high silica zeolites will be found stable, even at 10% water vapor, up to about 700° C. In any event, the temperature should be high enough to promote the desired reaction, say above about 200° C.

Temperatures below the maxima stated above based on zeolite stability will generally be preferred. For most compositions of exhaust gas plus a reducing agent treatment temperatures will be below 500° C. When using ammonia as the reducing agent, temperature must be controlled below 500° C., preferably below about 400° C.

In practicing the invention, a suitable reducing gas, ammonia, carbon monoxide, hydrogen or the like will be added to the exhaust gas stream upstream of the reactor in an amount such that the added gas together with any reducing agent present (e.g., carbon monoxide) will be about equal to the stoichiometric amount required for a desired reduction of $NO_x$.

An especially preferred embodiment is a honey-comb containing synthetic mordenite as the zeolite, useful as a catalyst for the reduction of nitrogen oxides with ammonia such as described in U.S. Pat. No. 3,895,094 to S. L. Carter et al. In accordance with the teachings of this patent, nitrogen oxides in exhaust gases from a variety of industrial processes (for example, fossil fuel power plants or nitric acid plants) are selectively reduced with ammonia, yielding nitrogen and water. An acid resistant aluminosilicate molecular sieve composition having substantially uniform intercrystalline pores with effective diameters of at least 6A. (i.e., mordenite), approximately a stoichiometric molar quantity of ammonia, and temperatures between 200° to 300° C. were employed to treat gas compositions containing trace to 10% oxygen, trace to 2% nitric oxide, and trace to 2% nitrogen dioxide. The patent teaches processing at up to 60,000 WHSV (ft.³ of gas at standard conditions per ft.³ of catalyst per hour). However, preferred space velocities are between 3000 to 30,000. In fact, in the examples, at 15,000 a 96% $NO_x$ reduction (260 ppm after processing vs. 6520 ppm before) is achieved while at 40,000 a loss in efficiency was found (no quantitative data given). The use of a mordenite containing honeycomb catalyst offers the ability to go to higher space velocities without the use of a longer reaction vessel. Mass transfer limitations can be overcome by use of a honey comb having more cells per square inch. Pressure drop is therefore not significantly affected and greater flexibility in reactor design is permitted.

In addition, problems often encountered in power plant $NO_x$ reduction systems involve plugging of fixed catalyst beds with particulate matter (i.e., fly ash, carbon). A honeycomb is less affected by such particulate matter.

Other advantages and features of the process using zeolitized honeycombs according to the invention will be apparent to those skilled in the art.

We claim:

1. In a process for reducing oxides of nitrogen contained in an exhaust gas by passing said gas in admixture with a gaseous reducing agent in contact with a synthetic zeolitic molecular sieve catalyst at an elevated temperature above about 200° C., the improvement which comprises contacting said gas at a space velocity of 3,000 to 60,000 volumes of gas per volume of catalyst per hour and a temperature below about 700° C. with said catalyst in the form of a monolithic body having channels extending therethrough, said body consisting essentially of fine crystals of a synthetic zeolite molecular sieve formed in situ by calcining a monolithic body of kaolin, treating the calcined body of kaolin with a caustic solution to develop a synthetic zeolitic molecular sieve therein and etch the surfaces thereof, said crystals of molecular sieve being disseminated throughout said body in an essentially amorphous alumina-silica porous residue of anhydrous calcined clay having etched diffusion paths to and from the embedded synthetic zeolitic molecular sieve.

2. The process of claim 1 wherein said crystals comprise from 2 to 90 weight percent of said structure.

3. The process of claim 1 wherein said crystals comprise faujasite-type zeolite.

4. The process of claim 1 wherein said crystals comprise ZSM-5 type zeolite.

5. The process of claim 1 wherein said crystals comprise mordenite.

6. The process of claim 1 wherein said body is in the form of a honeycomb.

7. The process of claim 1 wherein said body is in the form of a thin-walled honeycomb.

8. The process of claim 1 wherein said reducing gas is ammonia.

9. The process of claim 1 wherein said zeolite is in the acid form.

10. The process of claim 1 wherein said zeolite contains transition metal cations.

* * * * *